UNITED STATES PATENT OFFICE.

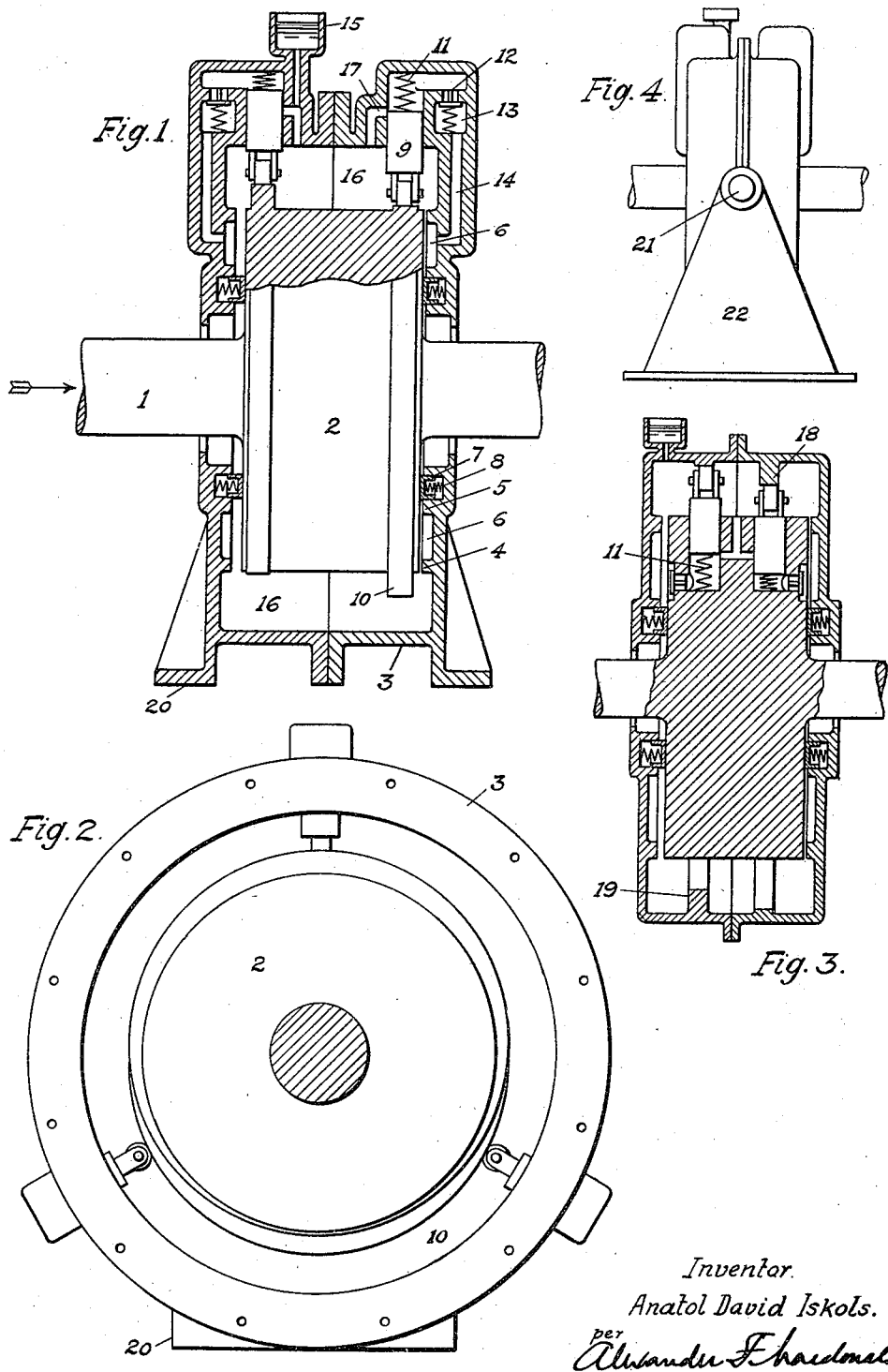

ANATOL DAVID ISKOLS, OF SCHENECTADY, NEW YORK.

HYDRAULIC THRUST-BEARING.

1,268,575.

Specification of Letters Patent.  Patented June 4, 1918.

Application filed February 12, 1916. Serial No. 77,970.

*To all whom it may concern:*

Be it known that I, ANATOL DAVID ISKOLS, a resident of the city of Schenectady, county of Schenectady, State of New York, have invented certain new and useful Improvements in Hydraulic Thrust-Bearings, of which the following is a specification.

My invention relates to thrust bearings especially for marine engines in which the thrust of the propeller is counterbalanced by hydraulic pressure exerted on a part of the shaft.

Thrust bearings for heavy duty, as for marine propulsion for example, and as now constructed, comprise a thrust shaft provided with a number of collars fixed thereon, each collar being held against axial movement by a separate adjustable bearing, generally in the shape of a horse shoe, all of which are carried by a common support of suitable shape, securely fastened to the bottom of the ship. Bearings of this kind involve a considerable and unavoidable loss of power caused by friction, which is evidenced by the necessity of providing an abundant lubrication, as well as an elaborate water cooling system in order to dissipate the heat resulting from friction. Besides, this type of thrust bearing requires, especially for large engines, a considerable length and occupies much space, which is very valuable and is not always readily available. For example, in a marine installation having a 20,000 horse power engine unit on the propeller shaft it is common practice to make these thrust bearings about fifteen feet long.

My present invention has for its object to overcome the objection above mentioned and to provide a thrust bearing in which the relatively rotatable parts are separated at all times by fluid under pressure so that the friction will be practically insignificant. Further objects of my invention are to provide a thrust bearing which occupies comparatively little space, is low in first cost, considering the character of the work to be performed, and in which the pumping means for supplying the necessary fluid pressure is incorporated in the thrust bearing itself as distinguished from the use of a pump or pumps separate therefrom.

For a consideration of what I believe to be novel and my invention, attention is directed to the accompanying description and claims appended thereto.

In the accompanying drawing which is illustrative of my invention, Figure 1 is an axial section of a hydraulic thrust bearing; Fig. 2 a front view of the bearing with one-half of the casing removed; Fig. 3 is a modification of the thrust bearing, and Fig. 4 shows a means for supporting the thrust bearing.

1 indicates a portion of the main shaft between the propeller and the main engine provided with a disk or member 2 which can be either forged in one piece with the shaft, as shown, or made as a separate piece, but securely fastened thereto. The disk is inclosed by a casing or member 3 of any suitable shape, but preferably concentric to the disk and split in the middle and perpendicular to the shaft for ease of manufacture and mounting in place. Each end wall of casing 3 has inside two concentric projections or rings 4, 5 with machined faces to coöperate with the faces of disk 2, the outside ring being not larger in diameter than disk 2. These projections have between them an annular groove 6 forming a chamber to receive fluid under pressure. The inner projection 5 contains a concentric groove in which is located a tightly fitting but axially sliding packing ring 7 which is pressed by means of light springs 8 against the disk 2. Casing 3 has in its circumferential portion pump cylinders, the pistons 9 of which are operated by eccentric shaped cams 10 on the disk 2 in conjunction with springs 11. Each plunger on its inward stroke sucks fluid from the atmospheric supply chamber 16 through the passage 17, the latter terminating in a port that is covered and uncovered by the movements of the plunger itself. This is an advantageous arrangement since it obviates the use of a suction valve, but such a valve may be employed if desired. Each pump discharges through a spring pressed check valve 12 into a small chamber 13 and from which it flows through passages 14 into the annular pressure chamber 6. Casing 3 is filled through funnel 15 with a suitable fluid, such as oil, glycerin, or even water, provided in the latter case, that the inner parts are made of non-corrosive materials. Care should be exercised to see that the casing is completely filled with fluid and that there are no air pockets therein. Here the purpose of the self-adjusting rings 7 becomes apparent, which is to prevent the escape or leakage of fluid through the opening in the casing around the shaft and their function is, therefore, of great importance. I have shown these rings carried by the casing, but they may be carried equally well by the disk since their function would be the same. So also the grooves or pressure chambers may be formed in the disk or partly in both disk and casing.

There are for each cam a set of at least three single acting pumps equally spaced around the shaft, as shown in Fig. 2, which for a circular shape of the cam insures that in any position and part of a revolution of the shaft 1 there is at least one pump delivering fluid under pressure, while the other two are in the suction period.

The operation of the thrust bearing is as follows: As soon as the engine starts revolving the propeller exerts a thrust, for example, in the direction of the arrow, and moves the shaft until the disk 2 closely approaches the right hand side of casing 3 and closes up the annular groove 6 to a greater or less extent; i. e., the axial clearance. At the same time the pumps 9 continuously deliver fluid under pressure to the annular groove or pressure chamber 6, which fluid is prevented by the sliding ring 7, which is in close contact with the disk, from escaping toward the shaft, and if the disk is so close to the outside ring 4, that the fluid cannot escape in that direction, it will acquire such a pressure that it will overcome the propeller thrust and push back the shaft, and with it the disk, to such an extent that the axial clearance or space between the projection 4 and disk 2 is sufficient to allow fluid to escape into the atmospheric supply chamber 16 formed between the periphery of the disk 2 and the wall of the surrounding casing. It is evident that whether the propeller thrust is constant or variable the disk 2 can never come in direct contact with the projection 4 of the casing, as the hydraulic pressure will instantly change in the same proportion and keep the disk at a certain distance in equilibrium. In other words, in this thrust bearing there is no friction between the metal parts, therefore, no frictional losses occur except those caused by the friction of the disk in the fluid, which is very slight.

In reversing the engine the propeller thrust will also change its direction and be from right to left, moving the shaft with the disk toward the left-hand end of the casing, the left-hand set of pumps, which before ran idle, will become operative and the same action as described above will take place but on the left-hand side.

Fig. 3 shows a modification of the thrust bearing wherein the pump cylinders are arranged within the disk, one set of pumps discharging through check valves into the left-hand annular groove of the casing, while the other set discharges into the right-hand annular groove. The casing is provided with eccentric cams 18 and 19, which, in conjunction with spring 11, operate the pump plungers in the same way as described above. This arrangement has the advantage of simplifying the construction of the casing. To state the matter another way, the pump parts in Fig. 3 have been reversed from those shown in Fig. 1.

The casing 3 can be provided, as shown in Figs. 1 and 2, with suitable legs 20, by means of which it can be fastened to a foundation secured in the ship. Another arrangement which is self adjusting is shown in Fig. 4. The casing constructed as in Fig. 1 is provided with two pivots or trunnion pins 21, diametrically opposed to each other by means of which it is pivoted in the bracket 22. Once this bearing has been adjusted in such a way that the axis of the pivots coincides with the axis of the shafting and is perpendicular to it, it will swing around the pivots and adjust itself automatically.

I do not limit my invention to the examples shown in the annexed drawing which, however, I consider the simplest and best being self-contained and once adjusted requiring no further care and attention, but other modification may be made to the same effect. I have shown the pumps arranged between the periphery of the disk and the inner wall of the casing, but in the broader aspects of by invention they may be otherwise disposed.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a hydraulic thrust bearing, the combination of a rotating shaft that is alternately subjected to end thrust in opposite directions, an annular thrust member rigidly mounted thereon, an inclosing casing, chambers located between the sides of the member and the adjacent side walls of the casing to which fluid under pressure is admitted, walls on opposite sides of the member that alternately coöperate with the casing wall to restrict the outward escape of fluid from the chambers, packing rings that are situated between said chambers and the shaft, follow the axial movements of the member and prevent the inward escape of liquid from the chambers, an exhaust chamber within the casing which surrounds said member, pump means within the casing which receive fluid from the exhaust chamber and deliver it to the pressure chambers, and means actuated by the member for driving the pump means.

2. In a hydraulic thrust bearing, the combination of a rotating shaft that is alternately subjected to end thrust in opposite directions, an annular thrust member rigidly mounted thereon, an inclosing casing, chambers located between the sides of the member and the adjacent side walls of the casing to which fluid under pressure is admitted, walls on opposite sides of the member that alternately coöperate with the casing wall to restrict the outward escape of fluid from the chambers, packing rings that are situated between said chambers and the shaft, follow the axial movements of the member and prevent the inward escape of liquid from the chambers, an exhaust chamber within the casing which surrounds said member, radially extending pump cylinders formed in the casing, plungers therefor which force liquid from the exhaust chamber into the pressure chambers, and cams on the rotating member which actuate the plungers.

In witness whereof, I have hereunto set my hand this 11th day of February, 1916.

ANATOL DAVID ISKOLS.

Copies of this patent may be obtained for five cents each, by addressing the "Commissioner of Patents, Washington, D. C."